US011165994B2

(12) United States Patent
Dedeoglu et al.

(10) Patent No.: US 11,165,994 B2
(45) Date of Patent: Nov. 2, 2021

(54) ANALYTICS-DRIVEN SUMMARY VIEWS FOR SURVEILLANCE NETWORKS

(71) Applicant: Texas Instruments Incorporated, Dallas, TX (US)

(72) Inventors: Goksel Dedeoglu, Plano, TX (US); Darnell Janssen Moore, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 399 days.

(21) Appl. No.: 14/277,002

(22) Filed: May 13, 2014

(65) Prior Publication Data

US 2014/0333776 A1 Nov. 13, 2014

Related U.S. Application Data

(60) Provisional application No. 61/822,670, filed on May 13, 2013.

(51) Int. Cl.
| | |
|---|---|
| *H04N 7/18* | (2006.01) |
| *H04N 21/8549* | (2011.01) |
| *G09G 5/14* | (2006.01) |
| *H04N 21/44* | (2011.01) |
| *H04N 21/218* | (2011.01) |
| *G06K 9/00* | (2006.01) |

(52) U.S. Cl.
CPC ............... *H04N 7/181* (2013.01); *G09G 5/14* (2013.01); *H04N 21/21805* (2013.01); *H04N 21/44008* (2013.01); *H04N 21/8549* (2013.01); *G06K 9/00771* (2013.01); *G09G 2340/02* (2013.01)

(58) Field of Classification Search
CPC ........ B06R 2300/105; G08B 13/19641; G08B 13/19643; G08N 13/19645; H04N 7/181
USPC ........................................ 348/159
See application file for complete search history.

(56) References Cited

U.S. PATENT DOCUMENTS

| | | | |
|---|---|---|---|
| 7,872,593 B1 * | 1/2011 | Rauscher | G06T 5/50 340/933 |
| 2007/0182818 A1 * | 8/2007 | Buehler | G08B 13/19641 348/143 |
| 2009/0288011 A1 * | 11/2009 | Piran | G06F 3/048 715/720 |
| 2010/0002070 A1 | 1/2010 | Ahiska | |

(Continued)

OTHER PUBLICATIONS

Yael Pritch et al, "Clustered Synopsis of Surveillance Video", 6th IEEE International Conference on Advanced Video and Signal Based Surveillance, Genoa, Italy, Sep. 2-4, 2009, pp. 195-200.

(Continued)

*Primary Examiner* — Sath V Perungavoor
*Assistant Examiner* — Kristin Dobbs
(74) *Attorney, Agent, or Firm* — Ebby Abraham; Charles A. Brill; Frank D. Cimino

(57) ABSTRACT

A method of displaying surveillance video streams is provided that includes receiving surveillance video streams generated by a plurality of video cameras, and displaying a selected subset of the surveillance video streams in a summary view on at least one display device, wherein, for each surveillance video stream in the summary view, only a relevant portion of each frame in the surveillance video stream is displayed, and wherein a relevant portion is a subset of a frame for at least some of the surveillance video streams in the summary view.

25 Claims, 5 Drawing Sheets

(56) References Cited

U.S. PATENT DOCUMENTS

| | | |
|---|---|---|
| 2012/0092446 A1 | 4/2012 | Peleg |
| 2013/0027551 A1 | 1/2013 | Peleg et al. |
| 2013/0169853 A1* | 7/2013 | Luong ............... H04N 5/23218 348/345 |
| 2013/0250121 A1* | 9/2013 | Piran ................. H04L 65/4084 348/159 |
| 2014/0085480 A1 | 3/2014 | Saptharishi |

OTHER PUBLICATIONS

"SeaStar Interactive Visualization for Wide Area Surveillance", Mamigo Inc., pp. 1-4, available at http://mamigoinc.com/downloads/brochure%2002.pdf, last visited on May 13, 2014.

"Digital Media Video Analytics Library (DMVAL)" User's Guide, Texas Instruments, Inc., Aug. 2013, pp. 1-40.

Takeo Kanade et al, "A System for Video Surveillance and Monitoring", technical report CMU-RI-TR-00-12, Robotics Institute, Carnegie Mellon University, May 2000, pp. 1-135.

Levente Kovacs et al, "Video Surveillance Framework for Crime Prevention and Event Indexing", Proceedings of ICT Solutions for Justice, Thessaloniki, Greece, Oct. 2008, pp. 1-15.

Toshihiko Hata et al, "Surveillance System with Object-Aware Video Transcoder", 2005 IEEE 7th Workshop on Multimedia Signal Processing, Shanghai, China, Oct. 2005, pp. 1-4.

"Honeywell Digital Video Manager User Guide", Honeywell International Inc., Document ZD36-003-200, Release 200, Issue 0, Sep. 2005, pp. 1-451.

"NetMatrix, Automatic Event-Driven Push Live Video, Intelligent Video Stream Delivery—Anywhere!", On-Net Surveillance Systems, Inc., available at http://www.moonblinkwifi.com/files/NetMatrix.pdf, last visited on May 13, 2014.

Dr. Alan J. Lipton, "Keynote: Intelligent Video as a Force Multiplier for Crime Detection and Prevention", Proceedings of IEEE International Symposium on Imaging for Crime Detection and Prevention, Jun. 7-8, 2005, London, UK, pp. 151-156.

Dr. Alan J. Lipton et al, "Critical Asset Protection, Perimeter Monitoring, and Threat Detection Using Automated Video Surveillance", IEEE Aerospace and Electronic Systems Magazine, Jun. 2003, pp. 1-11.

Dr. Alan J. Lipton, "Intelligent Video Surveillance in Crowds", ObjectVideo, pp. 1-10, available at http://www.objectvideo.com/software/overview/white-papers.html, last visited on May 13, 2014.

Yael Pritch et al, "Clustered Synopsis of Surveillance Video", Sixth IEEE International Conference on Advanced Video and Signal Based Surveillance, Sep. 2-4, 2009, Genova, Italy, pp. 195-200.

Ying-Li Tian et al, "Event Detection, Query, and Retrieval for Video Surveillance", Chapter XV of Artificial Intelligence for Maximizing Content Based Image Retrieval, 2009, pp. 342-370.

Robert T. Collins et al, "Algorithms for Cooperative Multisensor Surveillance", Proceedings of the IEEE, vol. 89, No. 10, Oct. 2001, pp. 1456-1477.

Cheng Peng, "Introduction to Video Surveillance Systems Over the Internet Protocol", Texas Instruments, Inc., White Paper SPRA951-A, Oct. 2003, pp. 1-9.

Aditya Mavlankar et al, "An Interactive Region-of-Interest Video Streaming System for Online Lecture Viewing", 18th International Packet Video Workshop, Dec. 13-14, 2010, Hong Kong, China, pp. 64-71.

Wei-Qi Yan et al, "Experiential Sampling for Monitoring", Proceedings of the 2003 ACM SIGMM Workshop on Experiential Telepresence, New York, NY, pp. 70-72.

\* cited by examiner

ANALYTICS-DRIVEN SUMMARY VIEWS FOR SURVEILLANCE NETWORKS

CROSS-REFERENCE TO RELATED APPLICATIONS

This application claims benefit of U.S. Provisional Patent Application Ser. No. 61/822,670, filed May 13, 2013, which is incorporated by reference herein in its entirety.

BACKGROUND OF THE INVENTION

Field of the Invention

Embodiments of the present invention generally relate to generating analytics-driven summary views of surveillance video streams.

Description of the Related Art

Video surveillance systems are typically installed to capture video feeds of areas of interest within a facility, around its perimeter, or in outdoor areas for the purpose of observing and/or recording events in these areas of interest related to, for example, security, safety, loss prevention, operational efficiency, and business intelligence. State of the art surveillance systems may include hundreds, if not thousands of video security cameras that feed surveillance video streams simultaneously into video analysis, recording, as well as an array of display monitor systems. Automated analysis of such video streams by computer programs, also known as video analytics (VA), can take place in edge devices (such as smart cameras), digital video recorders (DVR), network video recorders (NVR), and/or video management servers (VMS).

VA solutions are installed in surveillance systems to assist surveillance system operators in monitoring a large number of video feeds for defined events that the operators want to be alerted to when they occur. Using various computer vision algorithms, VA solutions can be configured to detect defined events from video streams in real-time. Such events may include, for example, motion detection, people or vehicles entering restricted areas, unattended objects, removal of assets from an area, crowding or grouping, tailgating of people or vehicles through security checkpoints, vehicles in no-parking zones, loitering, detection of specific of types of vehicles, e.g., bicycles, etc.

Since it is impractical for an operator to actively attend a multitude of video channels, VA products serve two needs, namely, real-time and offline video analysis. In real-time analysis, the VA system may generate audio-visual warnings of events to draw the attention of an operator to a subset of cameras for immediate action. Given such a warning, an operator may take actions such as viewing the scene from which the warning originated on a monitor, replaying the video stream of the event of interest, and/or activating a pan-tilt-zoom camera system to closely inspect the scene. In offline analysis, the VA system may support queries such as "list all the door-opening events in a specific camera's view over the last week". The queries may be answered, for example, by searching stored VA logs stored in the system and/or by analyzing recorded video stream(s) to search for specified events.

However, current VA solutions in surveillance may not provide operators with a sense of "situational awareness" when faced with a wall of monitors to observe.

SUMMARY

Embodiments of the present invention relate to methods, systems, and computer readable media for generating analytics-driven summary views of surveillance video streams. In one aspect, a method of displaying surveillance video streams is provided that includes receiving surveillance video streams generated by a plurality of video cameras, and displaying a selected subset of the surveillance video streams in a summary view on at least one display device, wherein, for each surveillance video stream in the summary view, only a relevant portion of each frame in the surveillance video stream is displayed, and wherein a relevant portion is a subset of a frame for at least some of the surveillance video streams in the summary view.

In one aspect, a surveillance system is provided that includes means for receiving surveillance video streams generated by a plurality of video cameras, and means for displaying a selected subset of the surveillance video streams in a summary view on at least one display device, wherein, for each surveillance video stream in the summary view, only a relevant portion of each frame in the surveillance video stream is displayed, and wherein a relevant portion is a subset of a frame for at least some of the surveillance video streams in the summary view.

In one aspect, a non-transitory computer readable medium is provided that stores software instructions that, when executed by at least one processor, cause a method of displaying surveillance video streams to be performed. The method includes receiving surveillance video streams generated by a plurality of video cameras, and displaying a selected subset of the surveillance video streams in a summary view on at least one display device, wherein, for each surveillance video stream in the summary view, only a relevant portion of each frame in the surveillance video stream is displayed, and wherein a relevant portion is a subset of a frame for at least some of the surveillance video streams in the summary view.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
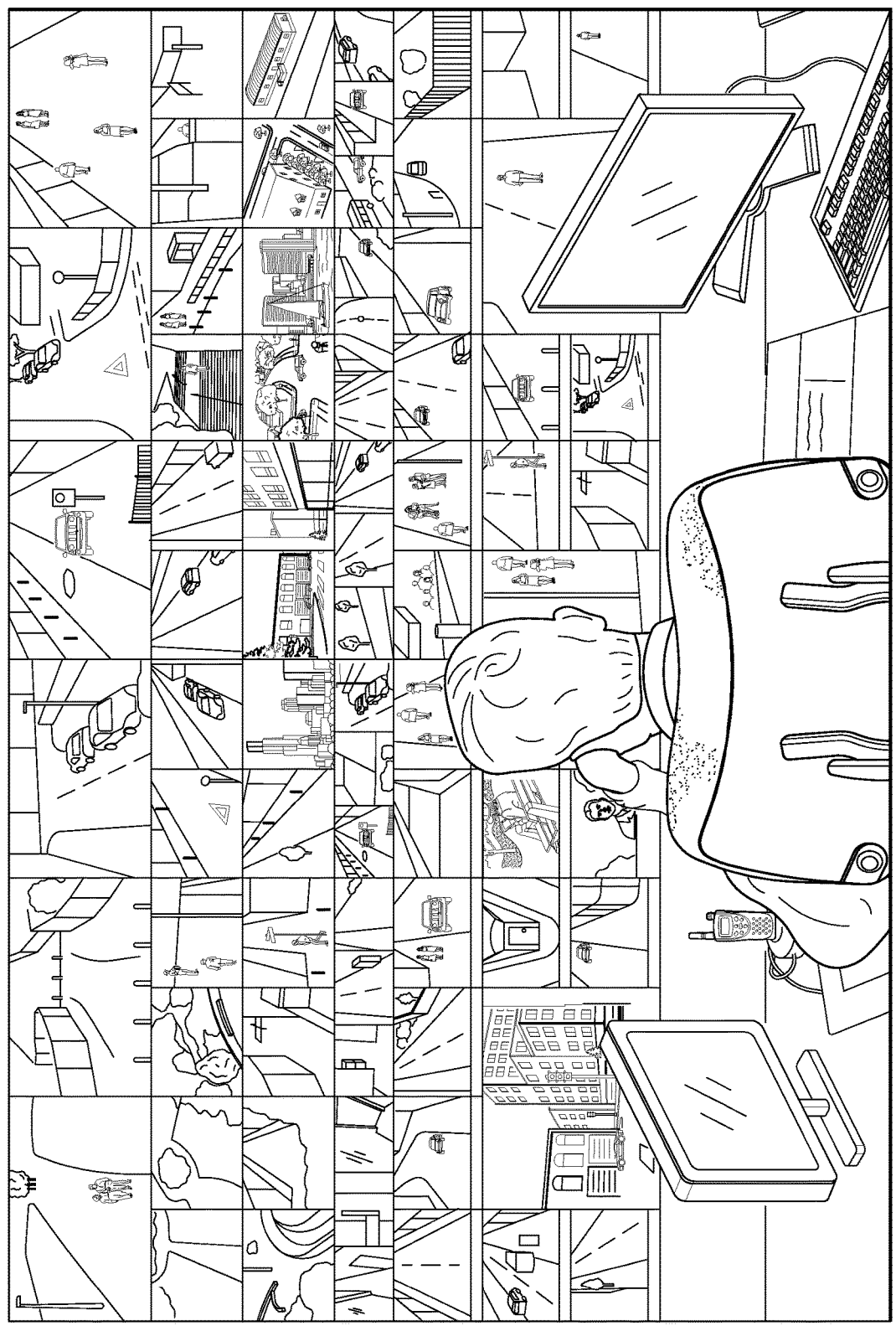
FIG. 1 is an example of prior art monitoring of multiple surveillance video streams.

Specific embodiments of the invention will now be described in detail with reference to the accompanying figures. Like elements in the various figures are denoted by like reference numerals for consistency.

In current large surveillance systems, surveillance system operators observing the video feeds face a wall of video monitors combining dozens of live views in a modern "situation room" and there is little discrimination from one camera feed to another. FIG. 1 shows an example of such a situation room. When nothing of "alert quality" is happening, a commonly used approach is to cycle the monitors from one feed into another for fixed amount of time and the monitor screens tend to be equally boring. In this mode of operation, attention grabbing things occur only when the video analytics (VA) system is actively reporting on a prescribed type of event, requesting the full attention of the human. For example, monitor #13 will switch to camera #4732 because the VA system has determined someone has crossed a fenced zone. In other words, the wall of monitors is unable to effectively provide surveillance system operators monitoring the total area under surveillance a sense of "situational awareness", i.e., a sense of what is happening across the monitored area; rather they are looking at a boring set of live feeds that cycle one after another, or responding to an alert condition.

Some surveillance systems provide simple ways of combining multiple video feeds into a single view on a single monitor for more effective consumption by system operators. In general, such systems spatially multiplex various video feeds at the frame level. For example, the frames of the video streams to be displayed may be down-sampled to a smaller size and displayed simultaneously on a single screen. In some systems, the down-sized video streams are displayed in a tiled format on a single monitor. For example, the screen may be divided into four or eight equal-sized display "windows", and four or eight video streams reduced to $\frac{1}{4}^{th}$ or $\frac{1}{8}^{th}$ of the full screen size for simultaneous display in these windows. In another example, the screen space may be divided into a large display window and some number, e.g., 4 or 6, smaller, equal-sized display windows, and the video streams reduced to appropriate sizes for simultaneous display.

Figure 2:
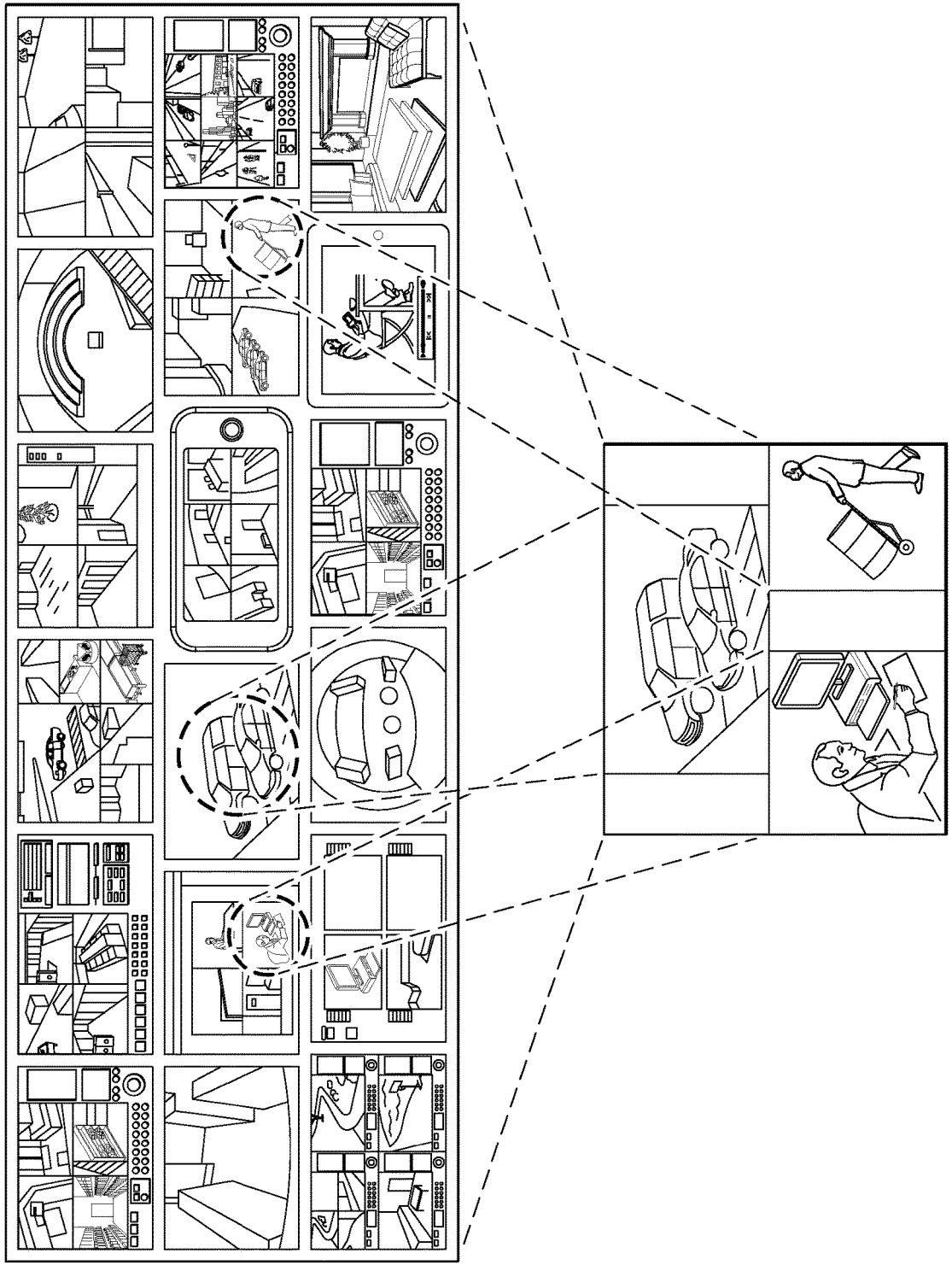
FIG. 2 is an example illustrating the concept of a summary view.

Embodiments of the invention provide for the generation of a dynamically composed summary view of surveillance video streams in which the particular video streams displayed are selected based on events detected in the video streams. Further, if a video stream is selected for inclusion in the summary view, the frames of the video stream are cropped to show only the portion of the scene relevant to the detected event. FIG. 2 is an example illustrating the concept of a summary view presented on a single display device in which frames of the video streams selected for display in the summary view are cropped to show only the relevant, i.e., event related, parts of the scenes.

Figure 3:
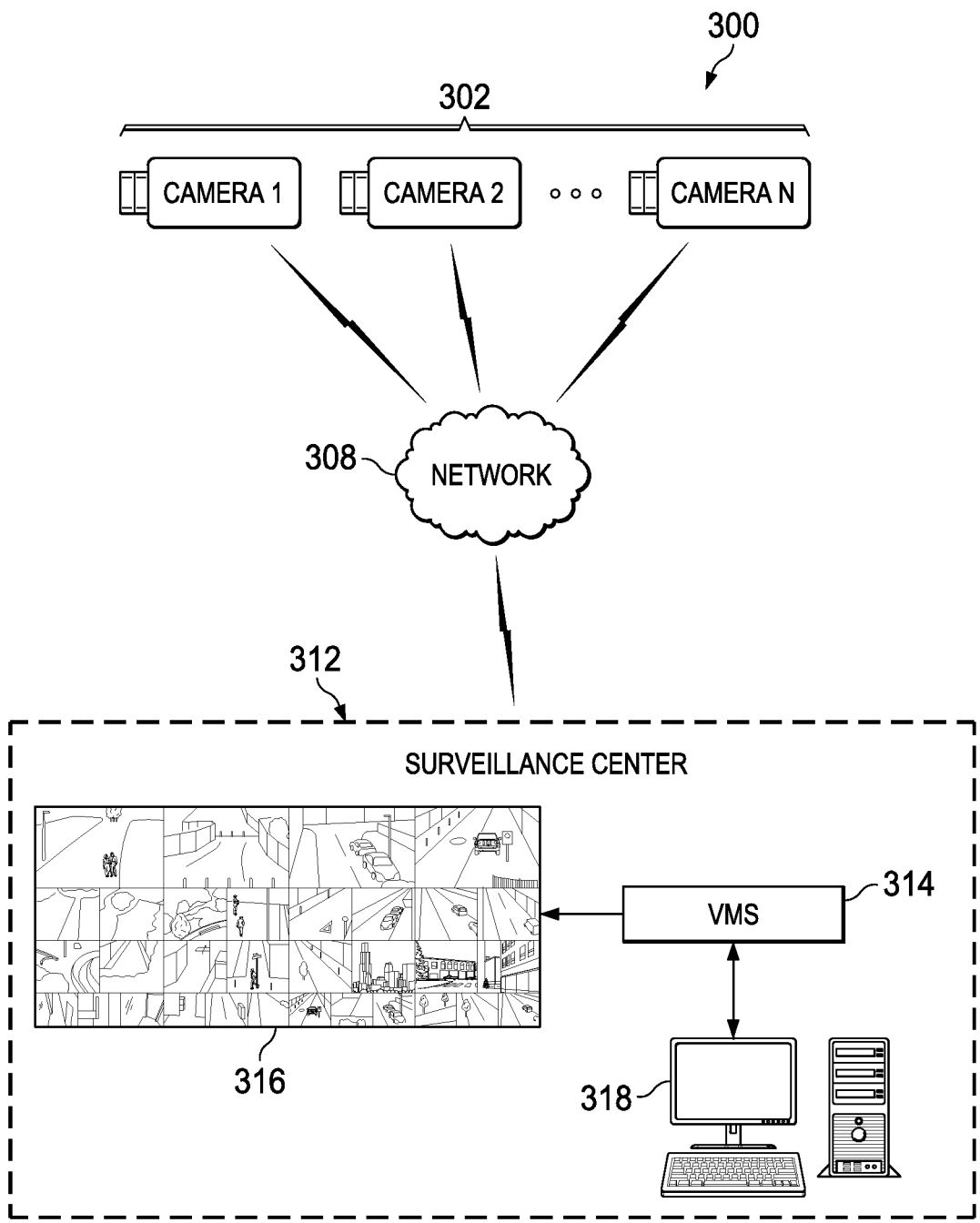
FIG. 3 is a simplified block diagram of a surveillance system.

FIG. 3 shows a simplified block diagram of a surveillance system 300 configured to dynamically compose summary views of surveillance video streams based on events detected in the surveillance video streams. The surveillance system 300 includes some integer number N of surveillance cameras 302 positioned to generate video streams (feeds) of areas of interest and a surveillance center 312 connected via a network 308. The network 308 may be any communication medium, or combination of communication media suitable for transmission of video sequences captured by the surveillance cameras 302, such as, for example, wired or wireless communication media, a local area network, or a wide area network.

The N surveillance cameras 302 may be any suitable cameras, such as, for example, digital internet protocol (IP) video cameras, analog video cameras, or a combination thereof. The surveillance cameras 302 may be stationary, may pan a surveilled area, may be mobile, e.g., mounted in a law enforcement vehicle, or a combination thereof. As is well known, IP cameras are configured to encode and transmit digital video signals over a network such as the network 308. Any analog surveillance cameras may be connected to a system (not specifically shown) that converts the analog video to a digital video signal and encodes and/or transmits the digital video stream over the network 308.

Further some or all of the IP cameras may include video analytics functionality that may be configured to detect defined events in the digital video stream captured by the camera. As is well known, an IP camera provisioned with video analytics may be programmed to detect one or more specific events in one or more zones in the field of view of a camera. A zone may also be referred to as a region of interest (ROI) in some VA applications. The particular events that may be detected and the sizes of the zones depend upon the particular VA algorithms implemented in the IP camera. Such cameras may also transmit a stream of metadata in association with the video stream that includes information regarding types of events detected in frames, the sizes and locations of the zones for those events, the sizes and locations of any bounding boxes of any objects corresponding to detected events, object centroids, the identification of camera, object labels, etc.

For example, the Digital Media Video Analytics Library (DMVAL) available from Texas Instruments for TI processor architectures that can be used in IP cameras supports events such as camera tamper detection, motion detection in user defined zones, and movement of objects from one user-defined zone to another. The library further supports the streaming of metadata associated with frames in the video stream. This metadata provides key features of the video stream to enable additional VA in a surveillance center receiving the video stream and metadata, e.g., the surveillance center 312. These features may include, for example, dimensions of an object bounding box, object centroid, etc., from moving objects in a user-defined zone.

The surveillance center 312 includes a video management server (VMS) 314, a number of monitors 316 (typically less than the number of video cameras 302) arranged for simultaneous viewing of video streams received from the cameras 302, and a summary view computer system 318. The VMS 314 receives the surveillance video streams from the cameras 302 and hosts management software to manage the display of these video streams on the monitors 316. The management software may manage the displaying of the video streams in any suitable way. As is well known, managing the display of multiple video streams may include displaying the video streams in a particular order, controlling how long video streams are displayed, assigning particular video streams to particular monitors, indicating detected events in a video stream when it is displayed, pushing a video stream to a monitor when a specific event or events are detected, etc. Further, the display management may be user-configurable such that a user can assign video streams to monitors, select how particular events in different video streams are to be visually indicated in those video streams, how often video streams assigned to one monitor are to be cycled, etc.

In embodiments in which some or all of the video cameras 302 include video analytics functionality programmed to detect specific events, the VMS 314 includes software to analyze the metadata streams from such cameras to determine what events have been detected and to perform actions such as indicating the events on monitors displaying the video streams.

In some embodiments, the VMS 314 hosts video analytics (VA) software that may be configured to detect defined events in the surveillance video streams. As is well known, a VMS provisioned with video analytics software may be configured to analyze incoming video streams to detect one or more specific events in one or more zones in the fields of view of the cameras generating the video streams. The particular events that may be detected in a given video stream and the sizes of the zones depend upon the particular VA algorithms implemented in the VA software. For example, some VA software may specify static zone sizes and locations for detection of particular events while other VA software may allow zone sizes and locations to be freely configured by a user. Similar to a video analytics equipped IP camera, the VA software in the VMS 314 may accumulate metadata in the analysis of a video stream that includes information such as types of events detected in frames, the sizes and locations of the zones for those events, the sizes and locations of any bounding boxes of any objects corresponding to detected events, object centroids, a unique identifier for the camera, object labels, etc.

Depending on the VA algorithms implemented in the VA software of the VMS 314, surveillance video streams from IP cameras may be further analyzed on the server to detect events that the cameras could detect but may have missed and/or events that the cameras cannot detect. Further, a combination of detection results reported by such cameras through metadata streams may be analyzed to infer new events, e.g., the server VA software analyzes events detected by more than one camera to generate a new meta-event such as, for example, some cameras are reporting more than five people in the respective fields of view so there is a crowd in the area.

The VMS 314 further includes functionality to provide video streams in which events have been detected (either by VA software of the VMS or video analytics of a camera) to the summary view computer system 318 along with metadata regarding the events such as event types, event priorities, the sizes and locations of the zones where the events were detected, the sizes and locations of any bounding boxes of any objects corresponding to detected events, object centroids, a unique identifier for the camera, object labels, etc.

The summary view computer system 318 hosts summary view software with functionality to compose selected surveillance video bit streams received from the VMS 314 into a composite view, i.e., a summary view, and to display this composite view on a display device, e.g., a monitor connected to the computer system 318. In general, the summary view software selects the surveillance video streams to be included in the composite view, designates an area in the composite view where elements from the selected surveillance video streams are to be displayed, and then displays those elements in the designated areas, cropping the frames of the video streams to display only the part of the frames that is relevant to the detected event. The relevant part of a frame may be, for example, the part of the frame corresponding to the zone in which the event was detected or the part of the frame corresponding to the bounding box of an object that triggered the event. For many events, the zone is a subset of the frame. However, for some events, e.g., tampering, the zone may include the entire frame. Note that the summary view software may determine the part of the frame to display for a given video stream from the metadata provided with the event detected in the video stream.

The selection of surveillance video streams to be included a summary view and the physical composition of the summary view, i.e., where each video stream is to be displayed and how much display area is allocated to each stream, is implementation dependent. For example, in some embodiments, surveillance streams may be selected on a first in first out (FIFO) basis. In another example, in some embodiments, a fixed physical composition may be used in which the display area is divided into some number of fixed size windows. In another example, in some embodiments, the physical composition may be dynamically determined based on the number of streams selected for display, i.e., the fewer the number of streams, the larger the display area for each stream. In another example, in some embodiments, surveillance video streams may be selected based on priority of the events detected in the streams. In another example, in some embodiments, surveillance video streams may be selected based on the types of the events detected in the streams, e.g., video streams with "bicycle detected" events are selected.

Further, the relevant part of a frame to be displayed may be implementation dependent. For example, in some embodiments, for any event, the relevant part may be defined as the part of a frame corresponding to the zone where the event was detected. In another example, in some embodiments, for events in which detection of an object in a zone, e.g., a face, a bicycle, a vehicle, etc., triggers the event, the relevant part may be defined as the part of a frame corresponding to a bounding box of the object.

Figure 4:
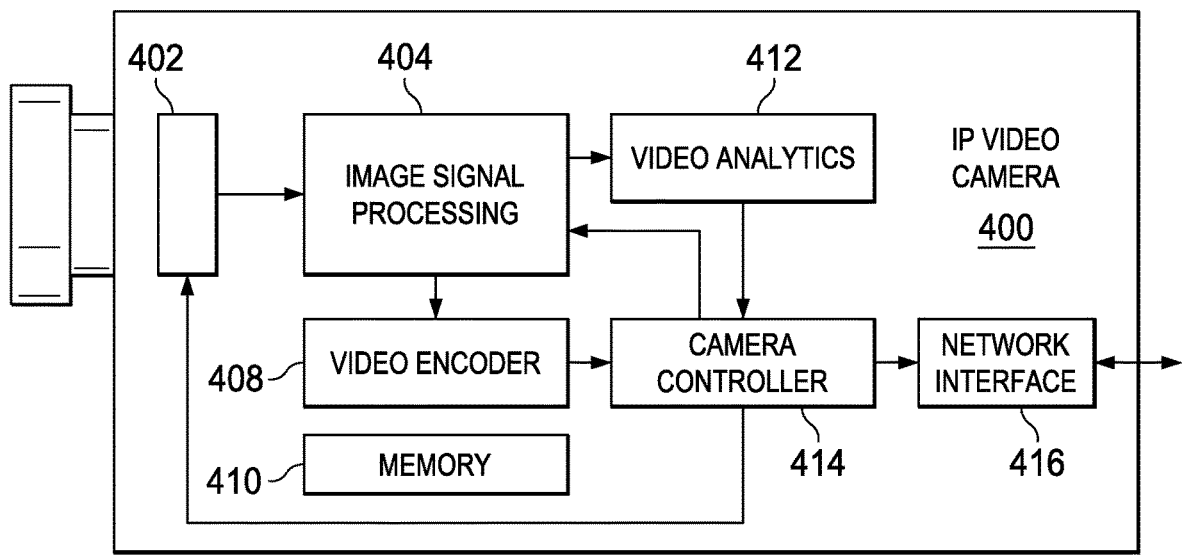
FIG. 4 is a simplified block diagram of a digital internet protocol (IP) video camera suitable for use in the surveillance system of FIG. 3.

FIG. 4 is a simplified block diagram of a digital IP video camera 400 suitable for use in the surveillance system 300 of FIG. 3. The IP video camera 400 includes an image sensor 402, an image signal processing component 404, a video encoder component 408, a memory component 410, a video analytics component 412, a camera controller 414, and a network interface 416. The components of the IP video camera 400 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory in the memory component 410 and executed by one or more processors (not specifically shown).

The imaging sensor 402, e.g., a CMOS sensor, a CCD sensor, etc., converts optical images to analog signals. These analog signals are converted to digital signals and provided to the image signal processing component 404.

The image signal processing component 404 divides the incoming digital signal into frames of pixels and processes each frame to enhance the image in the frame. The processing performed may include one or more image enhancement techniques. For example, the image processing component 404 may perform one or more of black clamping, fault pixel correction, color filter array (CFA) interpolation, gamma correction, white balancing, color space conversion, edge enhancement, detection of the quality of the lens focus for auto focusing, and detection of average scene brightness for auto exposure adjustment. The processed frames are provided to the video encoder component 408, the video analytics component 412, and the tampering detection component (206).

The video encoder component 408 encodes the processed frames in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

The memory component 410 may be on-chip memory, external memory, or a combination thereof. Any suitable memory design may be used. For example, the memory component 410 may include static random access memory (SRAM), dynamic random access memory (DRAM), synchronous DRAM (SDRAM), read-only memory (ROM), flash memory, a combination thereof, or the like. Various components in the IP video camera 400 may store information in memory in the memory component 410 as a video stream is processed. For example, the video encoder component 408 may store reference data in a memory of the memory component 410 for use in encoding frames in the video stream.

The camera controller component 414 controls the overall functioning of the IP video camera 400. For example, the camera controller component 414 may adjust the focus and/or exposure of the IP video camera 400 based on the focus quality and scene brightness, respectively, determined by the image signal processing component 404. The camera controller component 414 also controls the transmission of the encoded video stream via the network interface component 416 and may control reception and response to camera control information received via the network interface component 416. Further, the camera controller component 414 controls the transfer of metadata from the video analytics component 412 via the network interface component 416.

The network interface component 416 allows the digital video camera 400 to communicate with a monitoring system. The network interface component 416 may provide an interface for a wired connection, e.g., an Ethernet cable or the like, and/or for a wireless connection. The network interface component 416 may use any suitable network protocol(s).

The video analytics component 412 analyzes the content of frames of the captured video stream to detect events in zones in the field of view of the camera 400. The zones and the event or events to be detected in a zone may be configurable. The analysis capabilities of the video analytics component 412 may include, for example, video motion detection in which motion is detected with respect to a fixed background model to people counting, detection of objects crossing lines or areas of interest, vehicle license plate recognition, object tracking, face detection, automatically analyzing and tagging suspicious objects in a scene, etc. The video analytics component 412 may also generate a stream of metadata that includes, for example, types of events detected in frames, the sizes and locations of the zones where the events were detected, the sizes and locations of any bounding boxes of any objects corresponding to detected events, object centroids, object labels, the identification of camera, etc.

Any software instructions implementing the analysis capabilities of the video analytics component 412 or any other component of the camera 400 may be initially stored in a computer-readable medium such as a compact disc (CD), a diskette, a tape, a file, memory, or any other computer readable storage device and loaded and stored on the IP video camera 400. In some cases, the software instructions may also be sold in a computer program product, which includes the computer-readable medium and packaging materials for the computer-readable medium. In some cases, the software instructions may be distributed to the IP video camera 400 via removable computer readable media (e.g., floppy disk, optical disk, flash memory, USB key), via a transmission path from computer readable media on another computer system (e.g., a server), etc.

Figure 5:
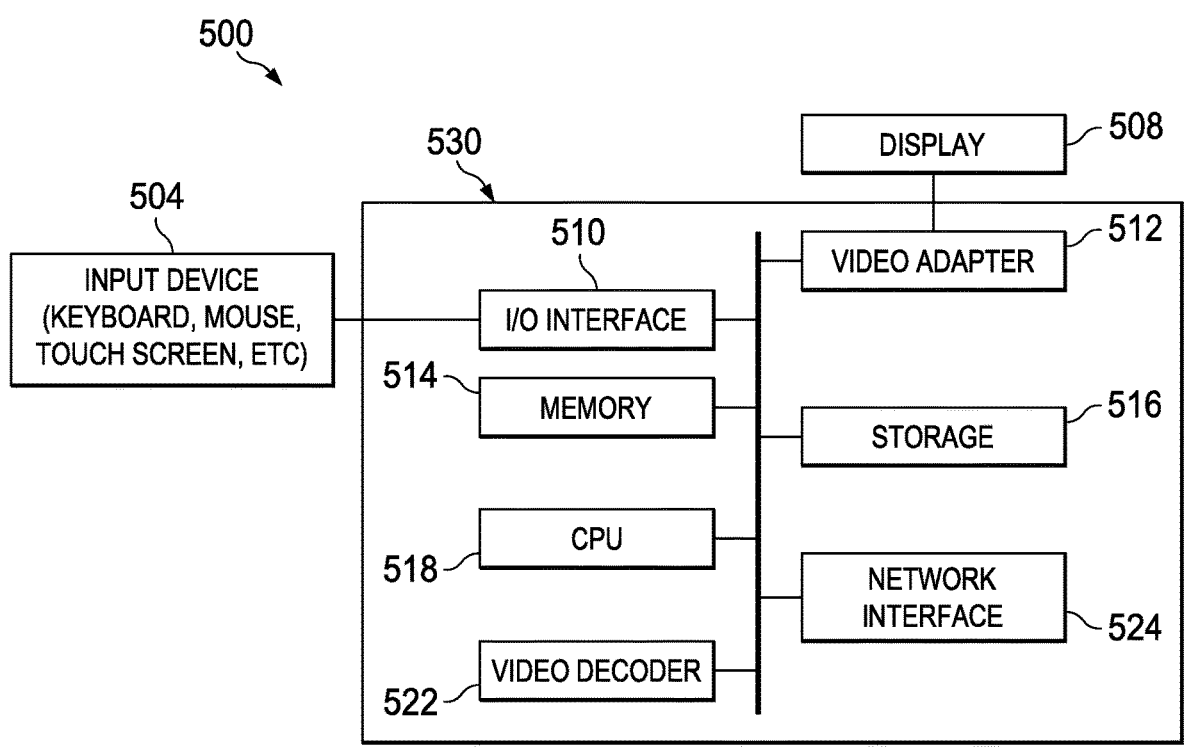
FIGS. 5 and 6 are simplified block diagrams of computer systems suitable for use in the surveillance system of FIG. 3.

FIG. 5 is a simplified block diagram of a computer system 500 that may be used as the video management server 314 in the surveillance network 300. The computer system 500 includes a processing unit 530 equipped with one or more input devices 504 (e.g., a mouse, a keyboard, or the like), and one or more output devices, such as a display 508, or the like. In some embodiments, the display 508 may be touch screen, thus allowing the display 508 to also function as an input device. The display may be any suitable visual display unit such as, for example, a computer monitor, an LED, LCD, or plasma display, a television, a high definition television, or a combination thereof.

The processing unit 530 includes a central processing unit (CPU) 518, memory 514, a storage device 516, a video adapter 512, an I/O interface 510, a video decoder 522, and a network interface 524 connected to a bus. The bus may be one or more of any type of several bus architectures including a memory bus or memory controller, a peripheral bus, video bus, or the like.

The CPU 518 may be any suitable type and suitable combination of electronic data processors. For example, the CPU 518 may include one or more processors from Intel Corp. or Advanced Micro Devices, Inc., one or more Reduced Instruction Set Computers (RISC), one or more Application-Specific Integrated Circuits (ASIC), one or more digital signal processors (DSP), or the like. The memory 514 may be any type of system memory such as static random access memory (SRAM), dynamic random access memory (DRAM), synchronous DRAM (SDRAM), read-only memory (ROM), flash memory, a combination thereof, or the like. Further, the memory 514 may include ROM for use at boot-up, and DRAM for data storage for use while executing programs.

The storage device 516 (e.g., a computer readable medium) may include any type of storage device configured to store data, programs, and other information and to make the data, programs, and other information accessible via the bus. The storage device 516 may be, for example, one or more of a hard disk drive, a magnetic disk drive, an optical disk drive, or the like. The storage device 516 stores the VA software instructions and the video management software instructions. The software instructions may be initially stored in a computer-readable medium such as a compact disc (CD), a diskette, a tape, a file, memory, or any other computer readable storage device and loaded and executed by the CPU 518. In some cases, the software instructions may also be sold in a computer program product, which includes the computer-readable medium and packaging materials for the computer-readable medium. In some cases, the software instructions may be distributed to the computer system 500 via removable computer readable media (e.g., floppy disk, optical disk, flash memory, USB key), via a transmission path from computer readable media on another computer system (e.g., a server), etc.

The video adapter 512 and the I/O interface 510 provide interfaces to couple external input and output devices to the processing unit 530. As illustrated in FIG. 5, examples of input and output devices include the display 508 coupled to the video adapter 512 and the mouse/keyboard 504 coupled to the I/O interface 510.

The network interface 524 allows the processing unit 530 to communicate with remote units via a network. For example, the network interface 524 allows the computer system 500 to communicate via a network to IP video cameras (or systems coupled to analog cameras) to receive encoded video sequences and other information transmitted by the video camera(s) (or systems coupled to analog cameras). The network interface 524 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

The video decoder component 522 decodes frames in encoded video sequences received from IP cameras and/or systems coupled to analog cameras in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), ITU-T/ISO High Efficiency Video Coding (HEVC) standard, etc.

Figure 6:
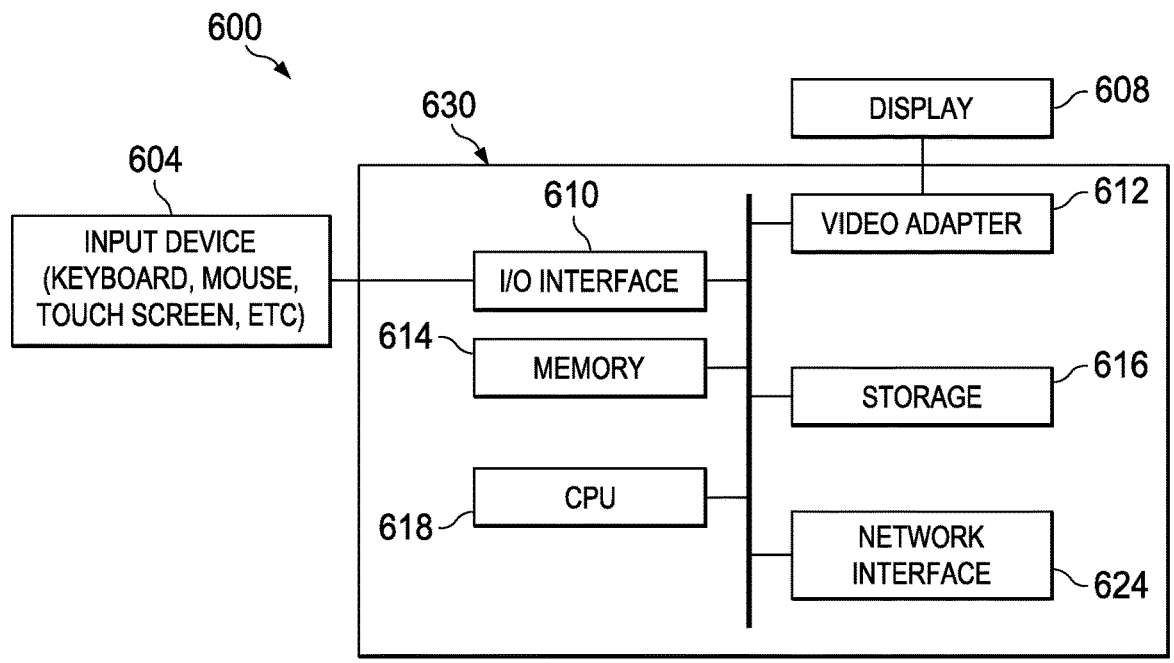

FIG. 6 is a simplified block diagram of a computer system 600 that may be used as the summary view computer system 318 in the surveillance network 300 of FIG. 3. The computer system 600 includes a processing unit 630 equipped with one or more input devices 604 (e.g., a mouse, a keyboard, or the like), and one or more output devices, such as a display 608, or the like. In some embodiments, the display 608 may be touch screen, thus allowing the display 608 to also function as an input device. The processing unit 630 may be, for example, a desktop computer, a workstation, a laptop computer, a dedicated unit customized for a particular application, or the like. The display may be any suitable visual display unit such as, for example, a computer monitor, an LED, LCD, or plasma display, a television, a high definition television, or a combination thereof.

The processing unit 630 includes a central processing unit (CPU) 618, memory 614, a storage device 616, a video adapter 612, an I/O interface 610, and a network interface 624 connected to a bus. The bus may be one or more of any type of several bus architectures including a memory bus or memory controller, a peripheral bus, video bus, or the like.

The CPU 618 may be any type of electronic data processor. For example, the CPU 618 may be a processor from Intel Corp., a processor from Advanced Micro Devices, Inc., a Reduced Instruction Set Computer (RISC), an Application-Specific Integrated Circuit (ASIC), or the like. The memory 614 may be any type of system memory such as static random access memory (SRAM), dynamic random access memory (DRAM), synchronous DRAM (SDRAM), read-only memory (ROM), flash memory, a combination thereof, or the like. Further, the memory 614 may include ROM for use at boot-up, and DRAM for data storage for use while executing programs.

The storage device 616 (e.g., a computer readable medium) may include any type of storage device configured to store data, programs, and other information and to make the data, programs, and other information accessible via the bus. In one or more embodiments, the storage device 616 stores software instructions of the summary view software. The storage device 616 may be, for example, one or more of a hard disk drive, a magnetic disk drive, an optical disk drive, or the like. The software instructions may be initially stored in a computer-readable medium such as a compact disc (CD), a diskette, a tape, a file, memory, or any other computer readable storage device and loaded and executed by the CPU 618. In some cases, the software instructions may also be sold in a computer program product, which includes the computer-readable medium and packaging materials for the computer-readable medium. In some cases, the software instructions may be distributed to the computer system 600 via removable computer readable media (e.g., floppy disk, optical disk, flash memory, USB key), via a transmission path from computer readable media on another computer system (e.g., a server), etc.

The video adapter 612 and the I/O interface 610 provide interfaces to couple external input and output devices to the processing unit 630. As illustrated in FIG. 6, examples of input and output devices include the display 608 coupled to the video adapter 612 and the mouse/keyboard 604 coupled to the I/O interface 610.

The network interface 624 allows the processing unit 630 to communicate with remote units via a network. For example, the network interface 624 allows the computer system 600 to communicate via a network to a VMS server to received surveillance video streams and metadata regarding detected events in the streams. The network interface 624 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

Figure 7:
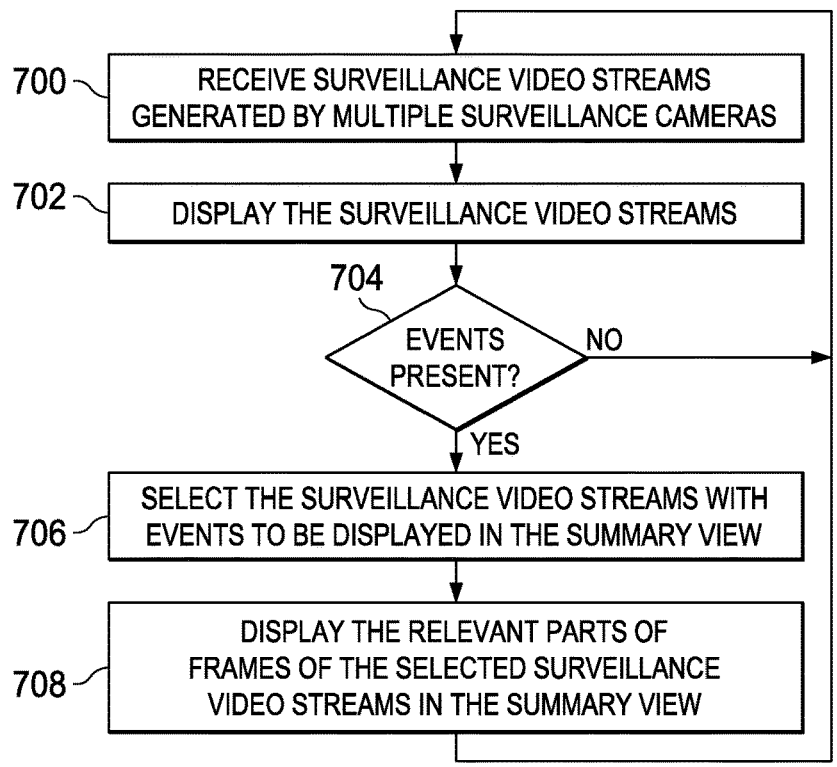
FIG. 7 is a flow diagram of a method for displaying surveillance video streams in summary views that may be performed in the surveillance system of FIG. 3.

FIG. 7 is a flow diagram of a method for displaying surveillance video streams in summary views that may be performed, for example, in the surveillance system 300 of FIG. 3. The method may be performed continuously while the surveillance system 300 is operating. As shown in FIG. 7, surveillance video streams generated by multiple surveillance video cameras are received 700 and are displayed 702 on multiple monitors. The surveillance video streams and accompanying metadata streams, if any, are analyzed for event detection. Analysis of surveillance video streams and/or metadata streams to detect events is previously described herein. When events are present 704, a summary view of selected 706 video streams with events is composed and relevant portions of frames of the selected video streams are displayed 708 in the summary view. As previously mentioned, the relevant part of a frame may be, for example, the part of the frame corresponding to the zone in which the event was detected or the part of the frame corresponding to the bounding box of an object that triggered the event.

Further, as previously mentioned, selection of surveillance video streams to be included a summary view and the physical composition of the summary view, i.e., where each video stream is to be displayed and how much display area is allocated to each stream, is implementation dependent. For example, in some embodiments, surveillance streams may be selected on a first in first out (FIFO) basis. In another example, in some embodiments, a fixed physical composition may be used in which the display area is divided into some number of fixed size windows. In another example, in some embodiments, the physical composition may be dynamically determined based on the number of streams selected for display, i.e., the fewer the number of streams, the larger the display area for each stream. In another example, in some embodiments, surveillance video streams may be selected based on priority of the events detected in the streams. In another example, in some embodiments, surveillance video streams may be selected based on the types of the events detected in the streams, e.g., video streams with "bicycle detected" events are selected.

Further, as previously mentioned, the relevant part of a frame to be displayed may be implementation dependent. For example, in some embodiments, for any event, the relevant part may be defined as the part of a frame corresponding to the zone where the event was detected. In another example, in some embodiments, for events in which detection of an object in a zone, e.g., a face, a bicycle, a vehicle, etc., triggers the event, the relevant part may be defined as the part of a frame corresponding to a bounding box of the object.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the video analytics are performed in IP cameras and in a server in the video surveillance center. One of ordinary skill in the art will understand embodiments in which other devices in a surveillance center may also be configured to perform video analytics on the surveillance video streams, e.g., a digital video recorder (DVR) recording incoming surveillance video streams or the summary view computer system.

In another example, embodiments have been described herein in which the summary view is displayed on a single display device. One of ordinary skill in the art will understand embodiments in which the summary view may be displayed on more than one display device to accommodate, for example, allowing a larger number of video streams to be displayed in the summary view than could be reasonably shown on a single display device.

In another example, embodiments have been described herein in which the display device showing the summary view is the display device, e.g., monitor, of the computer system generating the summary view. One of ordinary skill in the art will understand embodiments in which the "cropped" video streams of the summary view may be combined into a video stream and transmitted via a network to another digital system equipped to display such a video stream, e.g., a table computing device, a smart phone, or a laptop with appropriate client software.

Although method steps may be presented and described in a sequential fashion, one or more of the steps shown and described herein may be performed concurrently, may be combined, and/or may be performed in a different order than the order shown in the figures and/or described herein. Accordingly, embodiments should not be considered limited to the specific ordering of steps shown and/or described herein.

It is therefore contemplated that the appended claims will cover any such modifications of the embodiments as fall within the true scope of the invention.

What is claimed is:

1. A method, the method comprising:
receiving video streams from a plurality of video cameras;
detecting an object and an event in in respective ones of the video streams;
determining an event type for the detected event;
selecting a subset of the video streams to display in a summary view based at least in part on a priority of the detected event, wherein the priority of the detected event is based in part on whether at least two of the video streams include a same detected object and a same determined event type;
determining, by the video management server, a relevant portion in each of the selected subset of the video streams to display in the summary view, wherein the relevant portion is a subset of a frame in each of the selected subset of the video streams; and
displaying the relevant portion for each selected subset of the video streams in the summary view on at least one display device.

2. The method of claim 1, further comprising displaying the video streams on a plurality of monitors.

3. The method of claim 1, wherein the relevant portion of a video stream is one selected from a group consisting of a zone in a field of view of a video camera that generated the video stream and a bounding box of an object identified in the video stream.

4. The method of claim 1, wherein displaying the selected subset includes including a video stream in the selected subset when an object is detected in a zone in a field of view of a video camera that generated the video stream.

5. A non-transitory computer readable medium comprising instructions that, when executed by at least one processor, cause the at least one processor to:
receive a plurality of video streams from a plurality of video cameras;
detect an object and an event in respective ones of the video streams;
determine an event type for the detected event;
select a subset of the video streams to display in a summary view based at least in part on a priority of the detected event, wherein the priority of the detected event is based in part on whether at least two of the video streams include a same detected object and a same determined event type;
determine, by a video management server, a relevant portion in each of the selected subset of video streams; and
display the relevant portion in each of the selected subset of the video streams in the summary view on at least one display device.

6. The non-transitory computer readable medium of claim 5, wherein the relevant portion of a video stream is one selected from a group consisting of a zone in a field of view of a video camera that generated the video stream and a bounding box of an object identified in the video stream.

7. The non-transitory computer readable medium of claim 5, wherein the instructions that cause the at least one processor to display the selected subset include instructions that cause the at least one processor to include a video stream in the selected subset when an event is detected in a zone in a field of view of a video camera that generated the video stream.

8. The non-transitory computer readable medium of claim 7, wherein the instructions that cause the at least one processor to display the selected subset include instructions that cause the at least one processor to include a video stream in the selected subset based on a priority of the event detected in the surveillance video stream.

9. The non-transitory computer readable medium of claim 7, wherein the instructions that cause the at least one processor to display the selected subset include instructions that cause the at least one processor to include a video stream in the selected subset based on a type of the event.

10. The non-transitory computer readable medium of claim 5, wherein the instructions further cause the at least one processor to display the video streams on a plurality of monitors.

11. A device comprising one or more processors configured to:
receive a plurality of video streams from a plurality of video cameras;

detect an object and an event in respective ones of the video streams;

determine an event type for the detected event;

select a selected subset of the video streams to display in a summary view based at least in part on a priority of the detected event, wherein the priority of the detected event is based in part on whether at least two of the video streams include a same detected object and a same determined event type;

determine, by the video management server, a relevant portion in each of the selected subset of the video streams to display in the summary view, wherein the relevant portion is a subset of a frame in each of the selected subset of the video streams; and display the relevant portion of each of the selected subset of the video streams in the summary view on at least one display device.

12. The device of claim 11, wherein the selected portion of a video stream is one selected from a group consisting of a zone in a field of view of a video camera that generated the video stream and a bounding box of an object identified in the video stream.

13. The device of claim 11, wherein the one or more processors are further configured to include a video stream in the selected subset when an event is detected in a zone in a field of view of a video camera that generated the video stream.

14. The device of claim 13, wherein the one or more processors are further configured to include a video stream in the selected subset based on a priority of the event.

15. The device of claim 13, wherein the one or more processors are further configured to include a video stream in the selected subset based on a type of the event detected in the video stream.

16. The device of claim 11, wherein the one or more processors are further configured to display the video streams on a plurality of monitors.

17. The device of claim 11, wherein at least one video camera in the plurality of video cameras is a mobile video camera.

18. The device of claim 11, wherein each selected subset of the video streams is associated with metadata.

19. The device of claim 18, wherein the metadata includes one or more of the following:

the type of event;

size and location of the zones where the event was detected;

size and locations of any bounding boxes of any objects corresponding to the detected event;

object centroids; and object labels.

20. The method of claim 1, wherein at least one video camera in the plurality of video cameras is a mobile video camera.

21. The method of claim 1, wherein each selected subset of the video streams is associated with metadata.

22. The method of claim 21, wherein the metadata includes one or more of the following:

the type of event;

size and location of the zones where the event was detected;

size and locations of any bounding boxes of any objects corresponding to the detected event;

object centroids; and object labels.

23. The non-transitory computer readable medium of claim 5, wherein at least one video camera in the plurality of video cameras is a mobile video camera.

24. The non-transitory computer readable medium of claim 5, wherein each selected subset of the video streams is associated with metadata.

25. The non-transitory computer readable medium of claim 24, wherein the metadata includes one or more of the following:

the type of event;

size and location of the zones where the event was detected;

size and locations of any bounding boxes of any objects corresponding to the detected event;

object centroids; and object labels.

* * * * *